April 11, 1967  R. J. ORTOLANO ET AL  3,313,520
WELDED VANED DIAPHRAGM STRUCTURE
Filed March 15, 1966  2 Sheets-Sheet 1
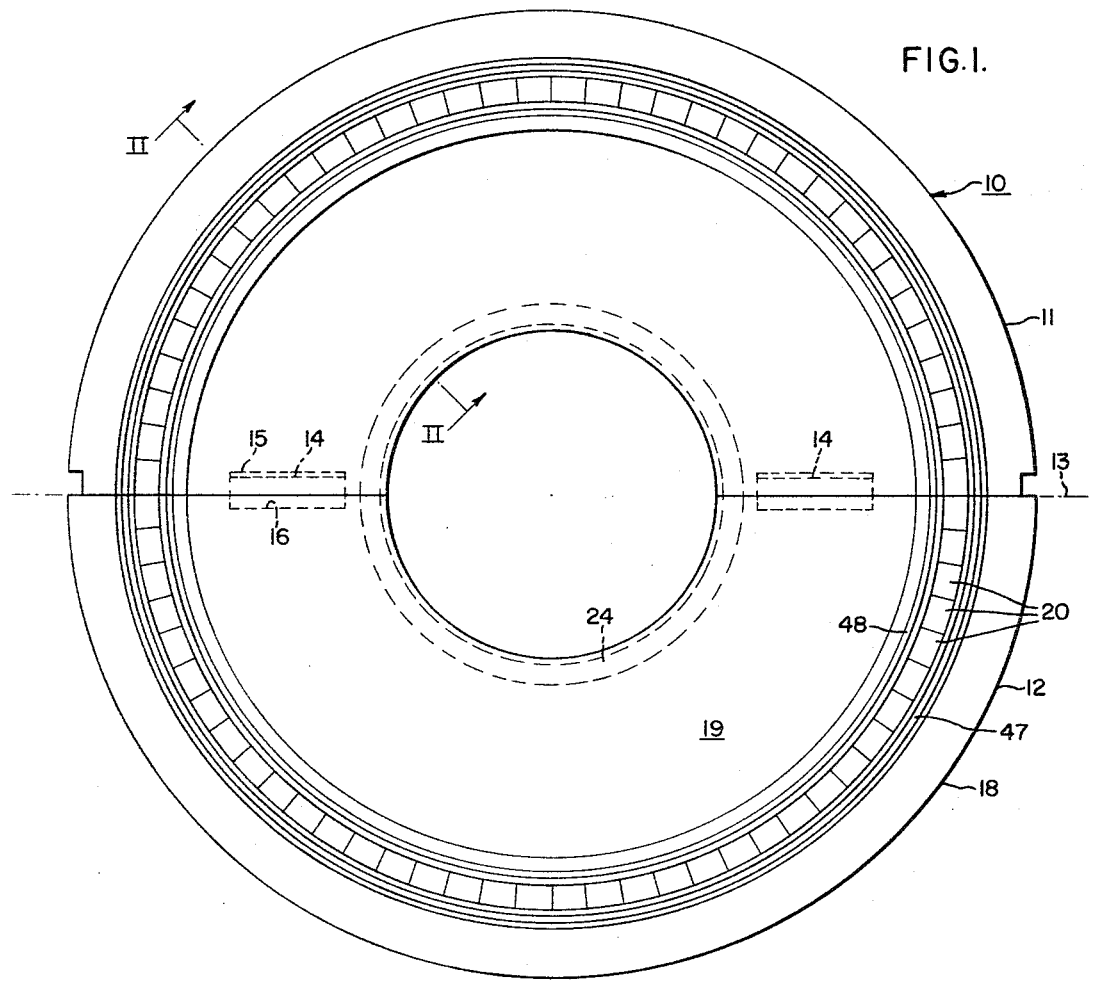
FIG.I.
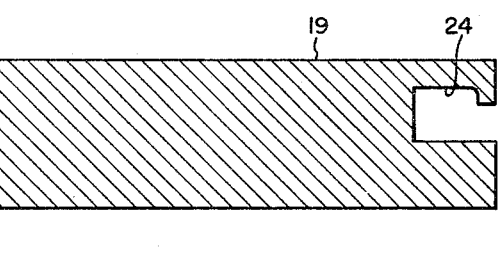
FIG.2.
WITNESSES
Theodore F. Wrobel
James F. Young
INVENTORS
Ralph J. Ortolano
and Norman Tenneson
BY
Frank Cristiano Jr.

April 11, 1967 R. J. ORTOLANO ET AL 3,313,520
WELDED VANED DIAPHRAGM STRUCTURE
Filed March 15, 1966 2 Sheets-Sheet 2 united States Patent Office 3,313,520
Patented Apr. 11, 1967

3,313,520
WELDED VANED DIAPHRAGM STRUCTURE
Ralph J. Ortolano, Saratoga, and Norman Tenneson, Santa Clara, Calif., assignors to Westinghouse Electric Corporation, Pittsburgh, Pa., a corporation of Pennsylvania
Filed Mar. 15, 1966, Ser. No. 534,339
7 Claims. (Cl. 253—78)

This invention relates to a vaned diaphragm structure of the type employed in elastic fluid handling machines such as turbines and compressors and has for an object to provide an improved structure of this type.

Turbines and compressors of the axial flow type employ stationary vane structure, usually known as diaphragms, in conjunction with the rotating blading to redirect the elastic fluid diverted by the rotating blades as it progresses through the stages of the machine, as well-known in the art.

This invention relates especially to diaphragm structures of the "all-welded" type, wherein the components of the diaphragm structure are integrally joined to each other by welded joints.

Although many "all-welded" diaphragm structures have heretofore been proposed and employed in the past, such structures are costly due to complexity involved in the numerous welding steps and considerable machining required after welding because of warping of the components incurred during the many welding steps. Such warping is incurred primarily due to unbalanced thermal stresses induced in the welding as well as uneven heating of the components during the welding.

It is a further object of the invention to provide a welded diaphragm structure having a reduced number of weld joints.

Another object of the invention is to provide a diaphragm structure in which all of the essential weld joints are concentric and of annular shape.

Yet another object is to provide a diaphgram structure in which the components are so formed that they may be readily and accurately positioned with respect to each other in preparation for welding, without the need for preliminary attachment of a portion of the components to each other by localized welding joints in preparation for the final welding joints required to complete the integration of the components into the final structure.

A still further object is to provide an arrangement for readily, yet accurately, positioning the entire annular array of vanes with respect to each other, in preparation for securement to the other components by the essential weld joints.

Briefly, in accordance with the invention, the diaphragm structure comprises an annular outer ring, an annular inner ring, an annular array of vanes, and inner and outer shroud rings. The vanes are preferably of any suitable cross sectional shape (such as airfoil shape) and the inner and outer rings are provided with annular arrays of openings conforming to the cross sectional shape of the vanes. The end or tip portions of the vanes are received in the corresponding openings of the shrouds, which shrouds are maintained in radially spaced relation with each other to jointly with the vanes define an annular array of passages for the flow of elastic fluid.

The outer tip portions of the vanes extend to a slight degree beyond the outer shroud and are keyed to the outer ring; and, in a similar manner, the inner tip portions of the vanes extend beyond the inner shroud and are keyed to the inner ring.

Accordingly, the above components are properly and accurately positioned with respect to each other in preparation for final integration by weld joints.

The components are so formed that a plurality of concentric annular recesses or grooves are jointly formed by the rings, shrouds and vanes. These recesses are substantially filled with weld metal during the welding steps to integrate the entire assembly into an "all-welded" diaphragm structure.

Preferably, a pair of axially opposed outer weld joints are provided to join the outer tips of the vanes, the outer shroud and the outer ring in a symmetrical manner, minimizing distortion by balancing any residual thermal stresses in the pair of joints; and, in a similar manner and for a similar reason, a pair of axially opposed outer weld joints are provided to join the inner tips of the vanes, the inner shroud and the inner ring.

The diaphragm structure is preferably formed of semicular ring and shroud components to facilitate installation and/or removal from the machine for which it is intended.

Since warpage is reduced with the above arrangement, the components may be initially formed to only a slightly larger size than required and finished to true dimensions by machining the excess metal after integration by welding.

The above and the objects are effected by the invention as will be apparent from the following description and claims taken in connection with the accompanying drawings, forming a part of this application, in which:

FIGURE 1 is a plan of a divided diaphragm structure formed in accordance with the invention;

FIG. 2 is a radial sectional view, on a larger scale, taken on line II—II of FIG. 1;

Figure 3:
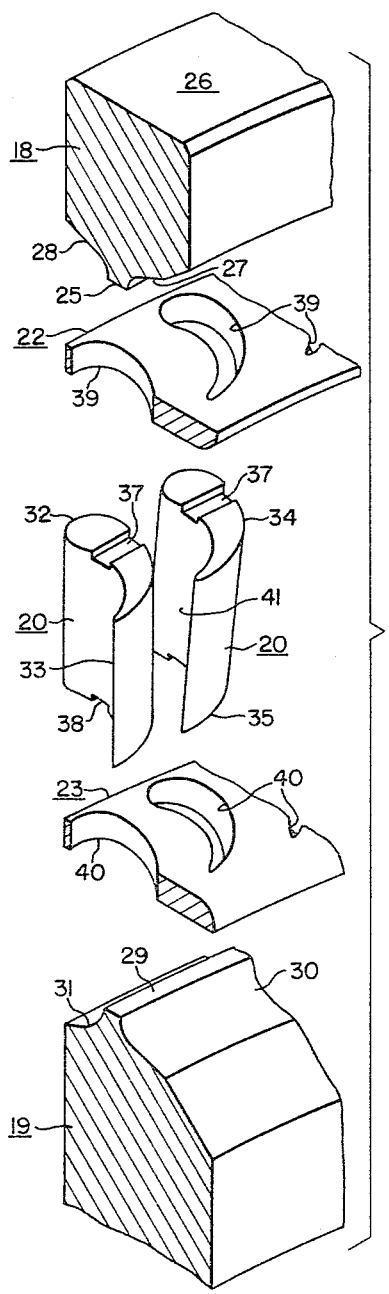
FIG. 3 is a fragmentary isometric view with the diaphragm components in "exploded" relation with each other.

Referring to the drawings in detail, in FIG. 1 there is shown an all-welded diaphragm structure 10 of the divided type comprising an upper half diaphragm structure 11 and a lower half diaphragm structure 12. The upper and lower diaphgram halves are disposed in abutment with each other along a common horizontal plane 13 as they would appear when installed in a machine (not shown) and are maintained in readily separable relation with each other by a pair of keys 14 received in suitable aligned grooves 15, 16 formed in the upper and lower diaphragm halves 11 and 12, respectively, as well known in the art.

Since the upper and lower diaphragm halves 11 and 12 are substantially identical only the lower diaphragm half 12 will be described.

The lower diaphragm half 12, as best shown in FIGS. 1 and 2, comprises a semicircular outer ring portion 18 and a semicircular inner ring portion 19 disposed in concentric spaced relation with each other and carrying a semicircular array of nozzle blades or vanes 20 disposed in spaced overlapping relation with each other, as well known in the art, to permit elastic fluid, such as motive steam turbine for example, to flow past.

To guide the flow of elastic fluid past the vanes 20, an outer semicircular shroud member 22 is interposed between the vanes 20 and the outer ring portion 18, and an inner semicircular shroud member 23 is interposed between the vanes 20 and the inner ring portion 19.

Also, the inner ring portion 19 is provided with a semicircular groove 24 for retaining a sealing structure (not shown) for well-known purposes.

Figure 4:
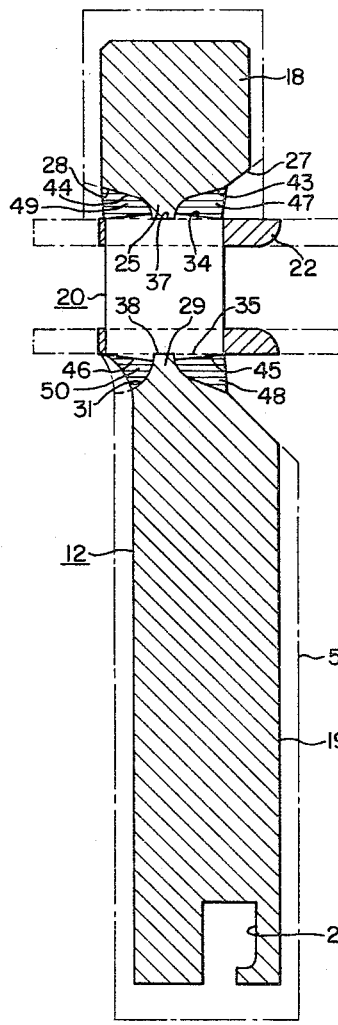
FIG. 4 is a view similar to FIG. 2 but illustrating the diaphragm structure after welding, but before machining, in dot-dash lines.

In accordance with the invention, as best shown in FIGS. 3 and 4, the outer ring portion 18 is provided with a radially inwardly extending annular rib portion 25 disposed concentrically with the annular outer peripheral surface 26 of the ring portion 18 and coextensive therewith. The rib 25 is partially defined by a pair of axially opposed divergent surfaces 27 and 28. In a similar manner, the inner ring portion 19 is provided with a radially outwardly extending annular rib portion 29 disposed concentrically with groove 24 (FIG. 4) and coextensive therewith. The rib 29 is partially defined by a pair of axially opposed divergent surfaces 30 and 31.

The vanes 20 are substantially identical to each other and are preferably of airfoil cross-sectional shape (FIG. 3) with rounded fluid inlet or leading portions 32 and thin fluid outlet or trailing portions 33. In the illustration, the vanes are of uniform cross sectional area and shape throughout, from their radially outermost tip portions 34 to their radially innermost tip portions 35. Each of the vanes is provided with a transverse groove or recess 37 in its outer tip portion 34 of a size and shape to receive the rib 25 with a keying action (FIG. 4) and a transverse recess or groove 38 in its inner tip portion 35 of a size and shape to receive the rib 29 with a keying action.

The outer shroud member 21 is a substantially semicircular band and is provided with a semicircular array of apertures 39 of substantially the same size and shape as the cross-section of the vanes 20. Similarly, the inner shroud member 23 is in the form of a semicircular band and is provided with a semicircular array of apertures 40 of substantially the same size and shape as the cross section of the vanes 20.

The apertures 39 and, similarly the apertures 40, are uniformly spaced from each other a predetermined distance and in a predetermined attitude to provide the proper gauging, i.e. the fluid flow spaces 41 between adjacent vanes 20 (as indicated in FIG. 3).

The above components, namely, the vanes 20, the inner and outer shroud members 23, 21, and the inner and outer ring members 19, 18 are preliminarily positioned in engaging relation with each other and maintained in such position by any suitable clamping fixture, not shown, in preparation for integration into the all-welded diaphragm half 12 by welding. More specifically, the outer tips 34 of the vanes are inserted in the apertures 39 of the outer shroud member and the inner tips 35 of the vanes are inserted in the apertures 40 of the inner shroud member. Then the rib 25 of the outer ring member 18 is brought into registering engagement with the grooves 37 in the outer tips of the vanes, and the rib 29 of the inner ring member 19 is brought into registering engagement with the grooves 38 in the inner tips of the vanes.

The thus positioned and clamped components form two pairs of V-shaped concentric annular grooves or recesses, including an outer axially opposed pair of recesses 43 and 44 of the same radial extent and an inner axially opposed pair of V-shaped concentric recesses 45 and 46 of the same radial extent. Referring to FIG. 4, the groove 43 is defined by the surface 27 of the outer ring member 18, the outer shroud member 21 and the outer vane tips 34; the groove 44 is defined by the surfaces 28 of the outer ring member 18, the outer shroud member 21 and the outer vane tips 34, the groove 45 is defined by the surface 30 of the inner ring member, the inner shroud member 23 and the inner vane tips 35; and the groove 46 is defined by the surface 31 of the inner ring member, the inner shroud member 23 and the inner vane tips.

During the welding operation, weld metal is deposited in the groove 43 to provide a filet weld connection 47 to a depth sufficient to seal the right half of the shroud apertures 39, and then in the groove 45 to provide a filet weld connection 48 to a depth sufficient to seal the right half of the shroud apertures 40. Subsequently, weld metal is deposited in the groove 44 to provide a filet weld connection 49 similar to the filet weld connection 47, and then in the groove 46 to provide a filet weld connection 50 similar to the weld connection 48.

Figure 5:
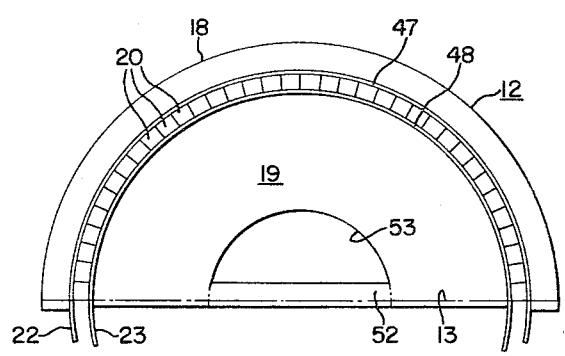
FIG. 5 is a plan of one of the diaphragm halves after welding, but before machining.

Since the weld connections 47 and 49 are disposed on opposite sides of the structure and substantially similar in size, shape and peripheral or linear extent as shown in FIGS. 1 and 5, any thermal stresses induced in the structure due to formation of the outer weld joint 47 are substantially opposed and balanced by the thermal stresses induced in the formation of the outer weld joint 49. Similarly, thermal stresses induced in the forming of the inner weld joint 48 are substantially opposed and balanced by the thermal stresses induced in the forming of the opposed weld joint 50, for the same reasons. Accordingly, warping or distortion of the thus integrated structure is substantially minified.

To insure that the final proportions and dimensions meet the required dimensional tolerances, it may be desirable to initially provide the outer and inner ring members 18 and 19, respectively and the inner and outer shroud members 23 and 22, respectively with oversize proportions, as indicated by the dot-dash contour 51, and then machine the entire structure to the required final dimensions. The proportions shown in FIG. 4 are considerably more generous than required and have been exaggerated for clarity of illustration.

Further, as shown in FIG. 5, to minify distortion during welding, the inner ring member 19 may be provided with a rib portion 52 extending diametrically across the semicircular aperture 53 which may be subsequently cut away during the final machining operation, at which time the semicircular groove 24 (FIG. 4) may be formed.

During the final excess material removing operation, as shown in FIG. 5, the diaphragm half structure 12 is machined along its bottom surface to the diametral plane 13 to provide a truly semicircular contour to the thus finished structure.

It will now be seen that with the invention there is provided an improved welded diaphragm structure for an axial flow fluid utilizing machine, which structure is comprised of components readily manufactured and therefore economical to produce and which may be integrated by economically produced circularly extending weld connections. Circular weld connections, as well known in the art, are readily adaptable to machine welding apparatus of any suitable type and hence such apparatus is not shown.

It must further be pointed out that each weld connection (45, 50, inclusive) is fully effective to joint its associated components and to lend its support in strengthening the diaphragm structure. None of the weld joints may be considered to be intermediate step joints of the type usually employed to pre-position components as a preliminary step in the fabrication of the diaphragm structure.

Preferably, the outer tip portions 34 and the inner tip portions 35 of the vanes 20 are slightly tapered in radially outward and inward directions, respectively (FIG. 4), to facilitate the keying engagement of the ribs 25 and 29, respectively, with the mating grooves 37 and 38 in the same tip portions.

While the invention has been shown in one form, it will be obvious to those skilled in the art that it is not so limited, but is susceptible of various other changes and modifications without departing from the spirit thereof.

We claim as our invention:
1. A stationary diaphragm structure for an axial-flow machine, comprising
   an outer ring member,
   an inner ring member disposed in radially inwardly spaced relation with said outer ring member,
   an annular array of vane members interposed between said outer and said inner ring members,
   said outer ring having an annular inwardly radially extending rib keying portion,
   said inner ring having an annular keying portion,
   said vanes having outer and inner tip portions,
   said outer tip portions having groove keying portions mating with the rib keying portion on said outer ring,
said inner tip portions having keying portions mating with the keying portion on said inner ring,
an annular outer weld joint connecting said vanes to said outer ring adjacent said outer tip portions,
an annular inner weld joint connecting said vanes to said inner ring adjacent said inner tip portions,
an annular outer shroud member having its outer surface abutting said rib and having an annular array of openings conforming to the cross-sectional shape of said vanes and having the outer tip portions of said vanes extending through said openings beyond the outer surface,
an annular inner shroud member having an annular array of openings conforming to the cross-sectional shape of said vanes and having the inner tip portions of said vanes received therein,
said outer shroud member being connected to said outer ring member and the outer tips of the vanes by said outer weld joint, and
said inner shroud member being connected to said inner ring member and the inner tips of the vanes of said inner weld joint.

2. The structure recited in claim 1, wherein
the keying portion on the inner ring member is provided by an annular radially extending rib, and
the mating keying portions on the vanes are provided by grooves.

3. The structure recited in claim 1 wherein
the vanes are of airfoil cross-sectional shape with a rounded leading portion and a thin trailing portion,
the outer weld joint connects the leading portions of the vanes to the outer ring,
the inner weld joint connects the leading portions of the vanes to the inner ring, and
further including a second annular outer weld joint connecting the trailing portions of the vanes to the outer ring, and
a second annular inner weld joint connecting the trailing portions of the vanes to the inner ring.

4. The structure recited in claim 1, wherein
the vanes are of airfoil cross-sectional shape with a rounded leading portion and a thin trailing portion,
the outer shroud member and the outer ring jointly define a first pair of opposed grooves,
the outer weld joint comprises weld metal disposed in one of said grooves,
a second outer weld joint comprising weld metal disposed in the other of said grooves,
the inner shroud member and the inner ring jointly define a second pair of opposed grooves,
the inner weld joint comprises weld metal disposed in one of said second pair of grooves, and
a second inner weld joint comprising weld metal disposed in the other of said second pair of grooves.

5. The structure recited in claim 1, wherein
the outer and inner weld joints and ring members are divided into semicircular halves, and
the inner ring halves are provided with mating keying means.

6. The structure recited in claim 1, wherein
the outer and inner weld joints, shroud members and ring members are divided into semicircular halves, and
the inner ring halves are provided with mating keying means.

7. The structure recited in claim 4, wherein
the outer and inner weld joints, shroud members and ring members are divided into semicircular portions,
the inner ring portions are provided with diametrically opposed abutting surface portions, and
mating keying means are provided for retaining the semicircular portions.

References Cited by the Examiner
UNITED STATES PATENTS

| | | | |
|---|---|---|---|
| 1,641,665 | 9/1927 | Devaud | 253—78 |
| 1,932,278 | 10/1933 | Lacey | 253—77 X |
| 2,264,877 | 12/1941 | Haigh | 253—78 |
| 3,038,699 | 6/1962 | Kaplan | 253—78 |

MARTIN P. SCHWADRON, *Primary Examiner.*

EVERETTE A. POWELL, JR., *Examiner.*